United States Patent
Chen et al.

(10) Patent No.: US 11,391,861 B2
(45) Date of Patent: Jul. 19, 2022

(54) PORTABLE SECURITY INSPECTION DEVICE BASED ON MILLIMETRE WAVE IMAGING

(71) Applicants: CHINA COMMUNICATION TECHNOLOGY CO., LTD., Shenzhen (CN); SHENZHEN INSTITUTE OF TERAHERTZ TECHNOLOGY AND INNOVATION, Shenzhen (CN)

(72) Inventors: Hanjiang Chen, Shenzhen (CN); Chunchao Qi, Shenzhen (CN); Zhihui Feng, Shenzhen (CN); Yanli Liu, Shenzhen (CN); Xiaoxiang Hou, Shenzhen (CN); Rong Wang, Shenzhen (CN)

(73) Assignees: CHINA COMMUNICATION TECHNOLOGY CO., LTD., Shenzhen (CN); SHENZHEN INSTITUTE OF TERAHERTZ TECHNOLOGY AND INNOVATION, Shenzhen (CN)

( * ) Notice: Subject to any disclaimer, the term of this patent is extended or adjusted under 35 U.S.C. 154(b) by 759 days.

(21) Appl. No.: 16/320,959

(22) PCT Filed: Jul. 26, 2016

(86) PCT No.: PCT/CN2016/091684
§ 371 (c)(1),
(2) Date: Jan. 25, 2019

(87) PCT Pub. No.: WO2018/018401
PCT Pub. Date: Feb. 1, 2018

(65) Prior Publication Data
US 2019/0293833 A1    Sep. 26, 2019

(51) Int. Cl.
*G01V 8/00* (2006.01)
*G01S 13/04* (2006.01)
(Continued)

(52) U.S. Cl.
CPC .............. *G01V 8/005* (2013.01); *G01S 13/04* (2013.01); *G01S 13/887* (2013.01); *G01V 3/00* (2013.01);
(Continued)

(58) Field of Classification Search
CPC ........ G01S 13/887; G01S 13/89; G01S 13/88; G01S 13/04; G01S 7/03; G01S 7/032; G01S 7/027; G01V 8/005
(Continued)

(56) References Cited

U.S. PATENT DOCUMENTS 7,844,081 B2 * 11/2010 McMakin .......... G06K 9/00348
382/115
D663,634 S * 7/2012 Townsend ..................... D10/47
(Continued)

FOREIGN PATENT DOCUMENTS

CN    102135629    7/2011
CN    202939690    5/2013
(Continued)

*Primary Examiner* — Erin F Heard
*Assistant Examiner* — Michael W Justice
(74) *Attorney, Agent, or Firm* — Maier & Maier, PLLC

(57) ABSTRACT

A portable security inspection device based on millimetre wave imaging comprising a hand-held body, wherein the hand-held body is provided with a millimetre-wave transmitting circuit for generating a millimetre-wave transmitting signal, a millimetre-wave array antenna for transmitting the millimetre-wave transmitting signal to a detected object and for receiving an echo signal reflected by the detected object,
(Continued)

and a millimetre-wave receiving circuit for processing the echo signal and converting the echo signal into image data of the detected object.

6 Claims, 5 Drawing Sheets

(51) Int. Cl.
    *G01S 13/88*     (2006.01)
    *G01V 3/12*     (2006.01)
    *G01V 8/20*     (2006.01)
    *G01V 3/00*     (2006.01)
    *G01S 7/02*     (2006.01)
    *G01S 13/89*     (2006.01)

(52) U.S. Cl.
    CPC .................. *G01V 3/12* (2013.01); *G01V 8/00* (2013.01); *G01V 8/20* (2013.01); *G01S 7/027* (2021.05); *G01S 13/89* (2013.01)

(58) Field of Classification Search
    USPC ..................................... 342/22, 179, 27, 191
    See application file for complete search history.

(56) References Cited

U.S. PATENT DOCUMENTS

| | | | |
|---|---|---|---|
| 9,575,172 B2* | 2/2017 | Charpentier | G01S 13/88 |
| 9,715,012 B2* | 7/2017 | Fernandes | G01S 13/89 |
| 2007/0263907 A1* | 11/2007 | McMakin | G06K 9/00369 |
| | | | 382/115 |
| 2009/0284405 A1* | 11/2009 | Salmon | G01K 11/006 |
| | | | 342/22 |
| 2012/0194376 A1* | 8/2012 | Daly | G01V 8/005 |
| | | | 342/22 |
| 2013/0021192 A1* | 1/2013 | Daly | G01V 3/15 |
| | | | 342/22 |
| 2014/0320331 A1* | 10/2014 | Fernandes | G01V 3/12 |
| | | | 342/22 |

FOREIGN PATENT DOCUMENTS

| | | |
|---|---|---|
| CN | 105510911 | 4/2016 |
| CN | 105607056 | 5/2016 |
| CN | 106094048 | 11/2016 |
| WO | 2012140587 | 10/2012 |

* cited by examiner

US 11,391,861 B2

PORTABLE SECURITY INSPECTION DEVICE BASED ON MILLIMETRE WAVE IMAGING

PRIORITY INFORMATION

This application is national stage entry under 35 U.S.C. 371 of PCT Patent Application No. PCT/CN2016/091684, filed Jul. 26, 2016, entire contents of which is incorporated herein by reference.

BACKGROUND OF THE DISCLOSURE

Technical Field

The present disclosure relates to millimeter wave imaging technologies, in particular to a portable security inspection device based on millimeter wave imaging.

Description of Related Art

The technical field of millimeter wave detection encompasses both active millimeter wave imaging and passive millimeter wave imaging. Active millimeter wave imaging reconstructs image information of a detected object by transmitting a millimeter wave signal with a certain power to the detected object and then receiving a signal reflected by the detected object, and passive millimeter wave imaging acquires an image generated by thermal radiation or background scattering of the detected object through a millimeter wave radiometer. Generally speaking, active millimeter wave imaging is less affected by the imaging environment and is able to acquire more information and to generate high-quality images.

However, existing active millimeter wave imaging systems are too large in overall size, poor in portability and high in cost, thereby being difficult to use and popularize.

BRIEF SUMMARY OF THE DISCLOSURE

This application discloses a portable security inspection device based on millimeter wave imaging.

The portable security inspection device based on millimeter wave imaging comprises:

a hand-held body;

a millimeter wave transmitting circuit, wherein the millimeter wave transmitting circuit is arranged on the hand-held body and is used for generating a millimeter wave transmitting signal;

a millimeter wave array antenna, wherein the millimeter wave array antenna is arranged on the hand-held body and is used for transmitting the millimeter wave transmitting signal to a detected object and receiving an echo signal reflected by the detected object; and a millimeter wave receiving circuit, wherein the millimeter wave receiving circuit is arranged on the hand-held body and is used for processing the echo signal and converting the echo signal into image data of the detected object.

One or more embodiments of the present disclosure are detailed below with reference to the following accompanying drawings. Other characteristics, objectives and advantages of the present disclosure are detailed in the specification, the accompanying drawings, and the claims.

BRIEF DESCRIPTION OF THE SEVERAL VIEWS OF THE DRAWINGS

In order to explain the technical solutions in embodiments of the present disclosure more clearly, the accompanying drawings required for describing the embodiments are briefly introduced below. Obviously, the following accompanying drawings are only used for certain embodiments of the present disclosure, and those ordinarily skilled in this field can obtain accompanying drawings for other embodiments without creative labor according to these accompanying drawings.

DETAILED DESCRIPTION OF THE DISCLOSURE

In order to make the objectives, technical solutions, and advantages of the present disclosure clearer, the present disclosure is further expounded below with reference to the accompanying drawings and embodiments. It should be understood that the specific embodiments in the following description are only used to explain the present disclosure and are not intended to limit the present disclosure.

Unless defined otherwise, all technical and scientific terms in this specification have meanings commonly appreciated by those skilled in the technical field of the present disclosure. These terms in this specification are only used to describe the objectives of the specific embodiments of the present disclosure and are not intended to limit the present disclosure. The term 'and/of' in this specification refers to any one or any combinations of one or more relevant items listed.

Figure 1:
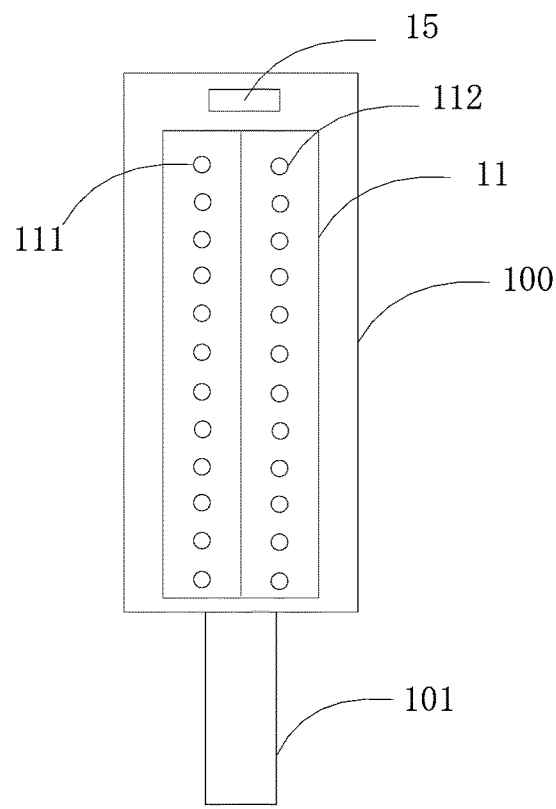
FIG. 1 is a front view of the portable security inspection device based on millimeter wave imaging in one embodiment.
Figure 2:
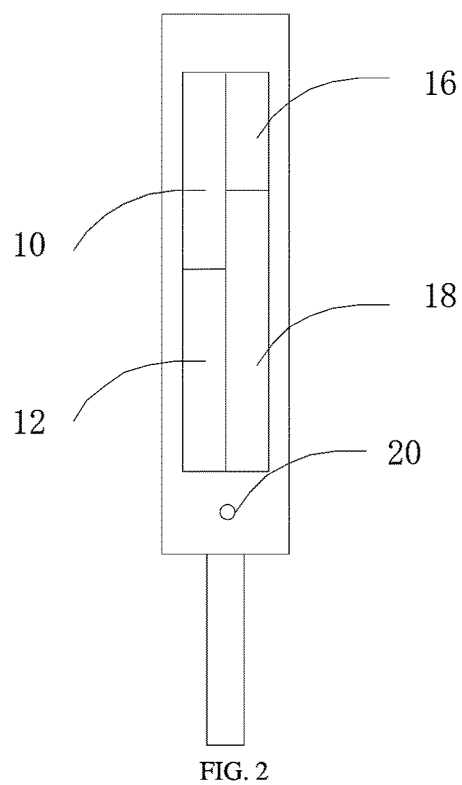
FIG. 2 is a side view of the portable security inspection device based on millimeter wave imaging in one embodiment.

Please refer to FIG. 1 and FIG. 2, wherein FIG. 1 is a front view of the portable security inspection device based on millimeter wave imaging in one embodiment, and FIG. 2 is a side view of the portable security inspection device based on millimeter wave imaging in one embodiment.

In this embodiment, the portable security inspection device based on millimeter wave imaging comprises a hand-held body 1, a millimeter wave transmitting circuit 10, a millimeter wave array antenna 11 and a millimeter wave receiving circuit 12.

The hand-held body 1 comprises a hand-held handle 101 and a scanner 100, wherein the hand-held handle 101 and the scanner 100 are connected fixedly or are connected through a rotary knob so that the scanner 100 can rotate around the hand-held handle at any angle. The millimeter wave transmitting circuit 10 is arranged on the hand-held body 1 and is used for generating a millimeter wave transmitting signal.

Figure 6:
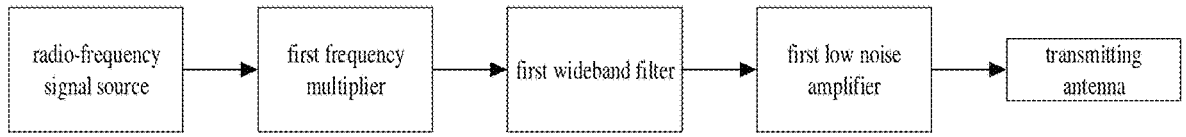
FIG. 6 is a basic structural block diagram of a millimeter wave transmitting circuit in one embodiment of the invention.

In one embodiment, as illustrated in FIG. 6, the millimeter wave transmitting circuit 10 comprises a radio-frequency signal source, a first frequency multiplier, a first wideband filter and a first low noise amplifier, wherein an output terminal of the radio-frequency signal source is connected to an input terminal of the first frequency multiplier, an output terminal of the first frequency multiplier is connected to an input terminal of the first wideband filter, an output terminal of the first wideband filter is connected to an input terminal of the first low noise amplifier, and the input terminal of the first low noise amplifier is connected to a transmitting antenna.

Wherein, multiple stages of first frequency multipliers, first wideband filters and first low noise amplifiers can be arranged, the first frequency multiplier in each stage is a small-factor frequency multiplier, a target frequency-amplified signal is obtained after frequency amplification is carried out multiple times, noise in the target frequency-amplified signal can be lowered, and the purity of the target frequency-amplified signal is improved, namely, the purity of the millimeter wave transmitting signal is improved.

The millimeter wave array antenna 11 is arranged on the hand-held body 1 and is used for transmitting the millimeter wave transmitting signal to a detected object and receiving an echo signal reflected by the detected object.

The millimeter wave array antenna 11 comprises a plurality of transmitting antennas 111 and a plurality of receiving antennas 112, wherein the distance between every two adjacent transmitting antennas 111 or between every two adjacent receiving antennas 112 ranges from a quarter of the operating wavelength to the operating wavelength, the distance between each transmitting antenna 111 and the adjacent receiving antenna 112 also ranges from a quarter of the operating wavelength to the operating wavelength, and the operating wavelength is a wavelength corresponding to the center frequency of the millimeter wave signal. In this way, millimeter wave signals received or transmitted by the antennas in the millimeter wave array antenna 11 are prevented from mutual interference, and the quality of images formed based on the millimeter wave signals is ensured. The transmitting antennas 111 are used for transmitting the millimeter wave transmitting signal, and the receiving antennas 112 are used for receiving the echo signal reflected by the detected object, wherein the echo signal is a reflected signal generated when the millimeter wave passes through the detected object. The transmitting antennas 111 and the receiving antennas 112 sequentially transmit and receive signals in a scanning manner, so that mutual interference between the signals transmitted by the transmitting antennas 111 and received by the receiving antennas 112 is avoided, and the imaging effect is good. A wider frequency band of the millimeter wave signals can fulfill a higher resolution and a better imaging effect.

The plurality of transmitting antennas 111 and the plurality of receiving antennas 112 are arranged on one side of the hand-held body 1 (namely the front side of the scanner 100) in columns respectively, wherein the transmitting antennas 111 are arrayed at intervals, the receiving antennas 112 are arrayed at intervals, and one column of the transmitting antennas 111 and one column of receiving antennas 112 are arranged side by side. A certain number of millimeter wave antennas are arranged on the hand-held body 1 to form the millimeter wave array antenna. The scanner 100 is small in superficial area and low in weight. When the security inspection device is used for security inspection of the detected object such as a human body, local parts of the human body can be easily scanned by holding the hand-held handle 101 and carrying out active millimeter wave scanning on the human body through the scanner 100, operation is flexible and comprehensive security inspection is ensured; and meanwhile, the millimeter wave imaging quality is good, and security inspection accuracy and efficiency are improved.

Figure 3:
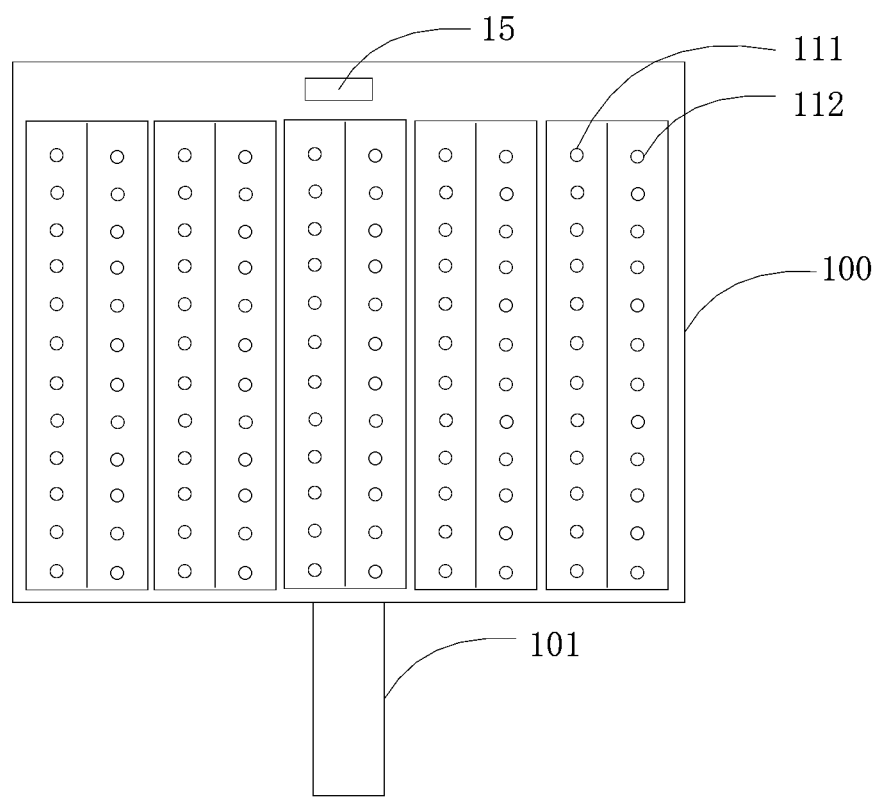
FIG. 3 is a front view of the portable security inspection device based on millimeter wave imaging in another embodiment.

Referring to FIG. 3, in one embodiment, a plurality of columns of transmitting antennas 111 and a plurality of columns of receiving antennas 112 are arrayed side by side, wherein the transmitting antennas 111 in column are arrayed at intervals, and the receiving antennas 112 in column are arrayed at intervals. As the number of the antennas is increased, the millimeter wave array antenna 11 has a larger scanning area. When used for detecting the human body, the security inspection device in this embodiment can locally scan the human body without being held or moved by hand and can obtain all of the image information of a detected part through one-time imaging by being aligned to the detected part, so that the imaging speed is high, the security inspection speed is increased, and the security inspection efficiency is improved.

The millimeter wave receiving circuit 12 is arranged on the hand-held body 1 and is used for processing the echo signal and converting the echo signal into image data of the detected object.

Figure 7:
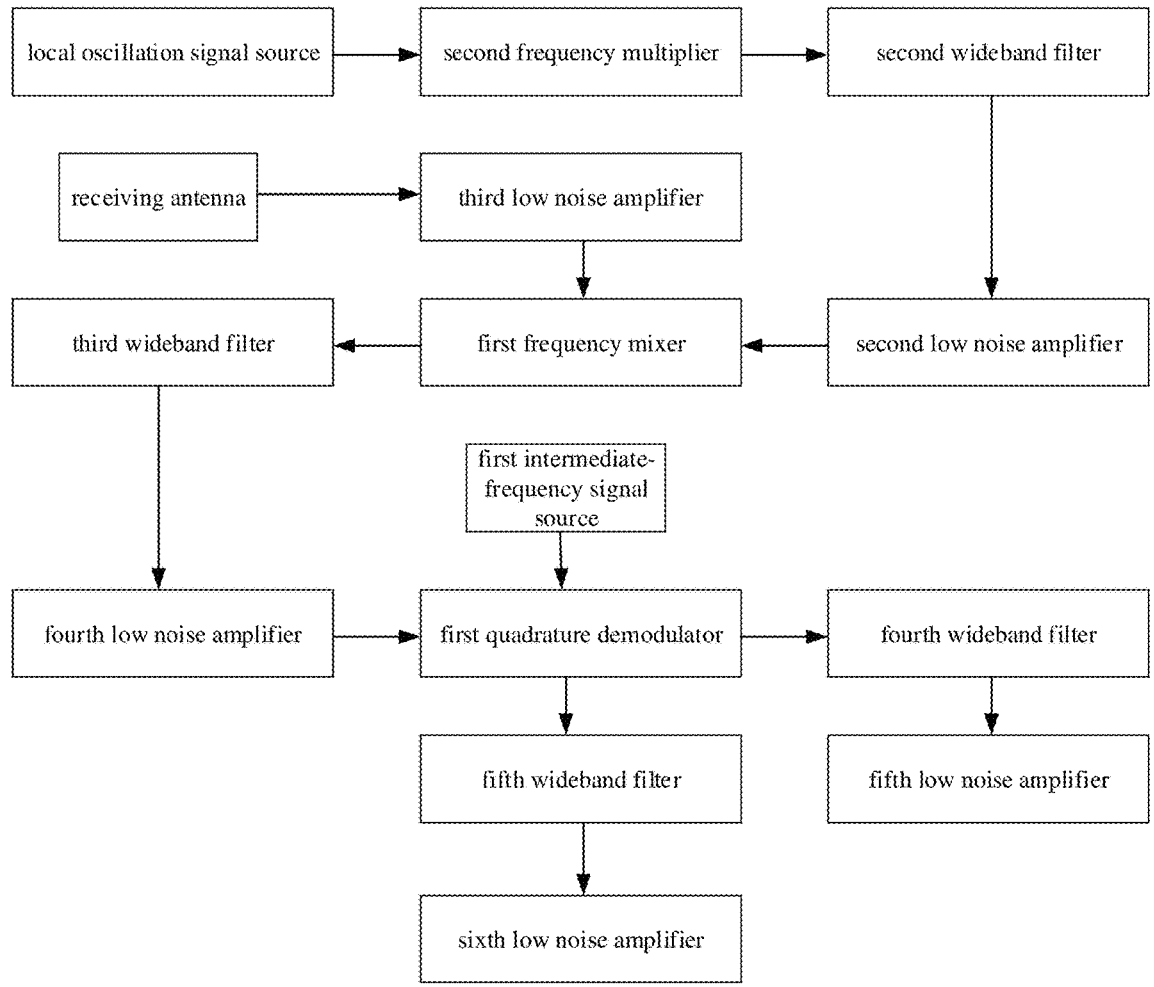
FIG. 7 is a basic structural block diagram of a millimeter wave receiving circuit in one embodiment of the invention.

As illustrated in FIG. 7, the millimeter wave receiving circuit 12 comprises a local oscillation signal source, a second frequency multiplier, a second wideband filter, a second low noise amplifier, a first frequency mixer, a third low noise amplifier, a first intermediate-frequency signal source, a first quadrature demodulator, a fourth low noise amplifier, a third wideband filter, a fourth wideband filter, a fifth wideband filter, a fifth low noise amplifier and a sixth low noise amplifier.

An output terminal of the local oscillation signal source is connected to an input terminal of the second frequency multiplier, an output terminal of the second frequency multiplier is connected to an input terminal of the second wideband filter, an output terminal of the second wideband filter is connected to an input terminal of the second low noise amplifier, an output terminal of the second low noise amplifier is connected to a local oscillation signal input terminal of the first frequency mixer, a high-frequency modulation wave input terminal of the first frequency mixer is connected to an output terminal of the third low noise amplifier, an input terminal of the third low noise amplifier is connected to the receiving antennas, an output terminal of the first frequency mixer is connected to an input terminal of the third wideband filter, an output terminal of the third wideband filter is connected to an input terminal of the fourth low noise amplifier, an output terminal of the fourth low noise amplifier is connected to an input terminal of the first quadrature demodulator, another input terminal of the first quadrature demodulator is connected to an output terminal of the first intermediate-frequency signal source, an in-phase component output terminal of the first quadrature demodulator is connected to an input terminal of the fourth wideband filter, a quadrature component output terminal of the first quadrature demodulator is connected to an input terminal of the fifth wideband filter, an output terminal of the fourth wideband filter is connected to an input terminal of the fifth low noise amplifier, and an output terminal of the fifth wideband filter is connected to an input terminal of the sixth low noise amplifier. The millimeter wave receiving circuit 12 and the millimeter wave transmitting circuit 10 are arranged on the side face of the hand-held body 1.

When the security inspection device is used, holding the hand-held handle 101 by hand to align the scanner 100 to the detected object, the millimeter wave transmitting circuit 10 generates a millimeter wave signal and then transmits the millimeter wave signal through the transmitting antennas 111, the millimeter wave signal is reflected to form an echo signal after encountering the detected object, and the echo signal is received by the receiving antennas 112 and is then processed by the millimeter wave receiving circuit 12, so that image information of the detected object is obtained and is used as a reference for a security inspection result. The security inspection device is simple in structure, flexible to use, capable of achieving security inspection of local parts of the detected object and good in imaging effect, thereby being able to replace traditional metal detectors and hand-held X-ray imaging instruments to be applied to locations with high demand such as subway stations, passenger stations and important places as a complement to active millimeter wave imaging system.

Figure 5:
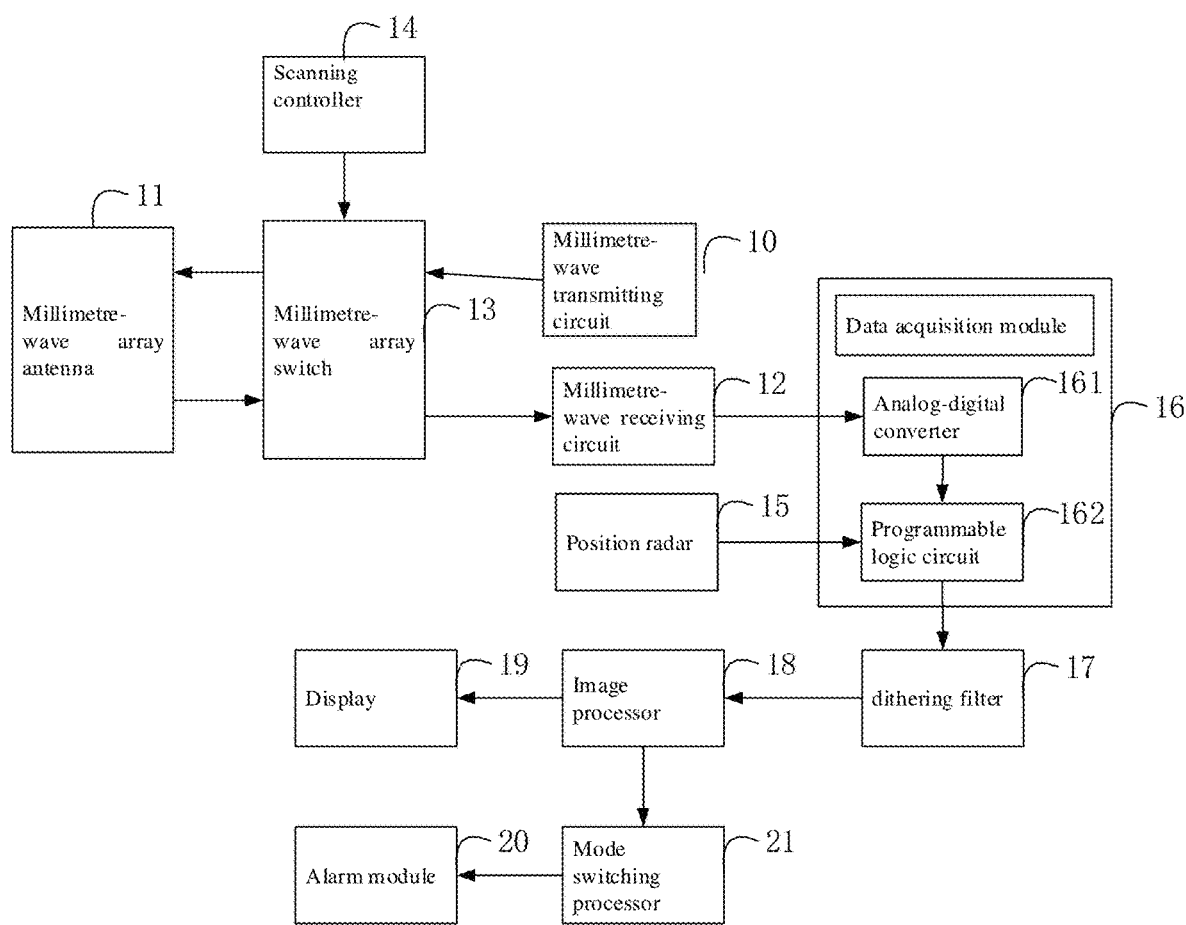
FIG. 5 is a signal processing block diagram of the portable security inspection device based on millimeter wave imaging in one embodiment.

Please refer to FIG. 5, wherein FIG. 5 is a signal processing block diagram of the portable security inspection device based on millimeter wave imaging in one embodiment.

In this embodiment, the security inspection device further comprises a millimeter wave array switch 13 arranged on the hand-held body 1, wherein the millimeter wave array switch 13 is connected with the millimeter wave array antenna 11 and is used for controlling on-off of each antenna in the millimeter wave array antenna 11. When the millimeter wave signal is been transmitted and received, it is controlled through the switch, namely a controllable electronic switch, that the millimeter wave array antenna 11 receives the signal via only one receiving antenna every time or transmits the signal via only one transmitting antenna every time, so that the interference between signals is minimized, wherein signal receiving and signal transmitting can be carried out at the same time, so that the imaging quality is ensured.

In one embodiment, the security inspection device further comprises a scanning controller 14 arranged on the hand-held body 1, wherein the scanning controller 14 is connected with the millimeter wave array switch 13 and used for controlling the millimeter wave array switch 13 to enable the millimeter wave array antenna 11 to sequentially transmit the millimeter wave transmitting signal in a preset time sequence or to receive the echo signal reflected by the detected object. The signal is received and transmitted in a scanning manner.

In one embodiment, the security inspection device further comprises a position radar 15, wherein the position radar 15 is arranged on the hand-held body 1 and is used for measuring the distance between the detected object and the security inspection device and the scanning displacement when the millimeter wave array antenna 11 is held by hand and moved to detect the detected object. The security inspection device is held by hand and moved to achieve security inspection of the detected object or is held by hand to achieve security inspection of the detected object without being moved. The position radar 15 records a moving path of the security inspection device relative to the detected object by measuring the linear distance between the detected object and the security inspection device and the scanning displacement for hand-held movement of the security inspection device in real time, the moving path of the security inspection device and the image information obtained by the scanner 100 form a two-dimensional image plane, and then image information of the detected object in a hand-held moving detection area is obtained.

In one embodiment, the security inspection device further comprises a data acquisition module 16, wherein the data acquisition module 16 is arranged on the hand-held body 1 and comprises an analog-digital converter 161 and a programmable logic circuit 162, an input terminal of the analog-digital converter 161 is connected to an output terminal of the millimeter wave receiving circuit 12, and an input terminal of the programmable logic circuit 162 is connected to an output terminal of the position radar 15 and an output terminal of the analog-digital converter 161. After being processed by the millimeter wave receiving circuit 12, the echo signal is converted by the analog-digital converter 161 into digital signals, then the digital signals are transmitted to the programmable logic circuit 162, the position radar 15 acquires the digital signals corresponding to the position information and moving path of the security inspection device and then transmits the digital signals to the programmable logic circuit 162, and the two digital signals are acquired by the programmable logic circuit 162.

In one embodiment, the security inspection device further comprises a dithering filter 17, wherein the dithering filter 17 is arranged on the hand-held body 1, is connected with the data acquisition module 16 and is used for compensating for a distance deviation between the security inspection device and the detected object according to the distance, so that the image data of the detected object acquired by the millimeter wave array antenna 11 is located on the same plane. As the security inspection device is held by hand during use, the imaging effect may be affected by hand shaking during the using process; the position radar 15 acquires the linear distance between the security inspection device and the detected object in real time, and the dithering filter 17 compensates for the linear distance deviation obtained during each time of scanning according to the linear distance, so that the acquired image information of the security inspection device is located on the same plane.

In one embodiment, the security inspection device further comprises an image processor 18, wherein the image processor 18 is arranged on the hand-held body 1, is connected with the dithering filter 17 and is used for converting the image data into a two-dimensional image to be output.

The data acquisition module 16 and the image processor 18 are arranged on the side face of the scanner 100.

Figure 4:
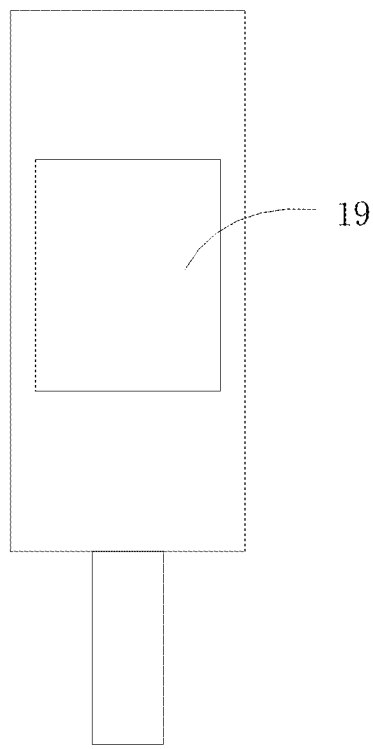
FIG. 4 is a rear view of the portable security inspection device based on millimeter wave imaging in one embodiment.

In one embodiment, the security inspection device further comprises a display 19, wherein the display 19 is connected with the image processor 18 and is used for displaying the two-dimensional image, and the display 19 is a liquid crystal display and is arranged on the back side of the scanner 100, as shown in FIG. 4.

In one embodiment, the security inspection device further comprises an alarm module 20, wherein the alarm module 20 is arranged on the hand-held body 1 and is used for giving an alarm when the security inspection device detects that the detected object is carrying a dangerous article. The alarm module 20 is arranged on the side face of the scanner 100 and can send out a voice and/or vibration alarm signal.

In one embodiment, the security inspection device further comprises a mode switching processor 21, wherein the mode switching processor 21 is arranged on the hand-held body 1 and is used for switching the working mode of the security inspection device, an input terminal of the mode switching processor 21 is connected to the image processor 18, an output terminal of the mode switching processor 21 is connected to the alarm module 20, and the security inspection device gives an alarm in one working mode when detecting that the detected object is carrying a dangerous article and does not give an alarm in the other working mode when detecting that the detected object is carrying a dangerous article, as explained below.

The security inspection device can work the following two working modes:

a. When used for security inspection of a human body, the security inspection device gives an alarm if detecting that the subject is carrying a dangerous article;

b. When used for security inspection of an article, the security inspection device does not give an alarm if detecting that a dangerous article is hidden in the detected article, and the security staff makes a judgment according to an image displayed by the display 19; meanwhile, in this working mode, a corresponding judgment algorithm can be set, so that a suspicious area is marked out by software for reference.

When the security inspection device is used, the hand-held handle 101 is held by hand, the scanner 100 transmits and receives a millimeter wave signal to obtain image data of the detected object, position information, including the distance between the security inspection device and the detected object and the moving path of the security inspection device, of the security inspection device is detected by the position radar 15, and the image data obtained through the scanner 100 is subjected to anti-dithering processing according to the distance, so that the image data of the detected object is located on the same plane, the imaging quality is prevented from being affected by hand shaking; the moving path and the image data form a two-dimensional image plane, and then image data of the detected object in the hand-held moving detection area is obtained; the image data is processed and are then displayed on the back side of the scanner 100, and the security staff can correctly judge whether or not the detected object is carrying a dangerous article according to the image displayed; and meanwhile, an alarm can be given out when a dangerous article is detected. The security inspection device can achieve security inspection of local parts of the detected object and is convenient and flexible to use and good in imaging effect.

The technical characteristics of the above embodiments can be combined freely. For the sake of a brief description, not all possible combinations of the technical characteristics of the above embodiments are described. All these non-contradictory combinations of the technical characteristics also fall within the scope of the present disclosure The above embodiments are only several illustrative ones specifically described in detail but are not intended to limit the patent scope of the present disclosure. What should be pointed out is that various transformations and improvements made by those ordinarily skilled in this field without deviating from the conception of the present disclosure also fall within the protection scope of the present disclosure.

What is claimed is:

1. A portable security inspection device based on millimeter wave imaging, comprising:
    a hand-held body;
    a millimeter wave transmitting circuit, arranged on the hand-held body and configured for generating a millimeter wave transmitting signal;
    a millimeter wave array antenna, arranged on the hand-held body and configured for transmitting the millimeter wave transmitting signal to a detected object and receiving an echo signal reflected by the detected object; and
    a millimeter wave receiving circuit, arranged on the hand-held body and configured for processing the echo signal and converting the echo signal into image data of the detected object;
    wherein the portable security inspection device further comprises a position radar arranged on the hand-held body and configured for measuring a distance between the detected object and the portable security inspection device and scanning displacement of the security inspection device when the millimeter wave array antenna is held by hand and moved to detect the detected object;
    wherein the portable security inspection device further comprises a data acquisition module arranged on the hand-held body and including an analog-digital converter and a programmable logic circuit, and an input terminal of the analog-digital converter is connected to an output terminal of the millimeter wave receiving circuit, an input terminal of the programmable logic circuit is connected to an output terminal of the position radar and an output terminal of the analog-digital converter;
    wherein the portable security inspection device further comprises a dithering filter arranged on the hand-held body, connected with the data acquisition module and configured for compensating for a distance deviation between the portable security inspection device and the detected object according to the distance, so that image data of the detected object acquired by the millimeter wave array antenna is located on a same plane;
    wherein the portable security inspection device further comprises an image processor arranged on the hand-held body, connected with the dithering filter and configured for converting the image data into a two-dimensional image to be output;
    wherein the portable security inspection device further comprises an alarm module arranged on the hand-held body and configured for giving an alarm when the portable security inspection device detects that the detected object is carrying a dangerous article; and
    wherein the portable security inspection device further comprises a mode switching processor arranged on the hand-held body and configured for switching a working mode of the portable security inspection device, an input terminal of the mode switching processor is connected to the image processor, an output terminal of the mode switching processor is connected to the alarm module, and the portable security inspection device gives an alarm in one working mode when detecting that the detected object is carrying a dangerous article and does not give an alarm in another working mode when detecting that the detected object is carrying a dangerous article.

2. The portable security inspection device according to claim 1, wherein the millimeter wave array antenna includes a plurality of transmitting antennas and a plurality of receiving antennas, a distance between every two adjacent said transmitting antennas or every two adjacent said receiving antennas ranges from a quarter of an operating wavelength to the operating wavelength, a distance between each said transmitting antenna and the adjacent receiving antenna ranges from a quarter of the operating wavelength to the operating wavelength, and the operating wavelength is a wavelength corresponding to a center frequency of the millimeter wave transmitting signal.

3. The portable security inspection device according to claim 2, wherein the plurality of transmitting antennas and the plurality of receiving antennas are arranged on one side of the hand-held body in columns, the transmitting antennas in column are arrayed at intervals, and the receiving antennas in column are arrayed at intervals.

4. The portable security inspection device according to claim 2, comprising:
   a millimeter wave array switch arranged on the hand-held body, connected with the millimeter wave array antenna and configured for controlling on-off of each said antenna in the millimeter wave array antenna.

5. The portable security inspection device according to claim 4, further comprising:
   a scanning controller arranged on the hand-held body, connected with the millimeter wave array switch and configured for controlling the millimeter wave array switch to enable the millimeter wave array antenna to sequentially transmit the millimeter wave transmitting signal in a preset time sequence or to receive the echo signal reflected by the detected object.

6. The portable security inspection device according to claim 1, comprising:
   a display connected with the image processor, configured for displaying the two-dimensional image and arranged on one side of the hand-held body.

\* \* \* \* \*